United States Patent
Ackerman et al.

(10) Patent No.: US 10,919,252 B2
(45) Date of Patent: Feb. 16, 2021

(54) SYSTEM AND PROCESS FOR MAKING A POUCH OR CONTAINER

(71) Applicant: S. C. Johnson & Son, Inc., Racine, WI (US)

(72) Inventors: Bryan L. Ackerman, Freeland, MI (US); Jose Porchia, Saginaw, MI (US)

(73) Assignee: S. C. Johnson & Son, Inc., Racine, WI (US)

(*) Notice: Subject to any disclaimer, the term of this patent is extended or adjusted under 35 U.S.C. 154(b) by 434 days.

(21) Appl. No.: 15/408,565

(22) Filed: Jan. 18, 2017

(65) Prior Publication Data

US 2017/0203531 A1   Jul. 20, 2017

Related U.S. Application Data

(60) Provisional application No. 62/280,496, filed on Jan. 19, 2016.

(51) Int. Cl.
| | |
|---|---|
| *B31B 70/00* | (2017.01) |
| *B31B 70/18* | (2017.01) |
| *B31B 70/96* | (2017.01) |
| *B31B 70/81* | (2017.01) |
| *B31B 70/04* | (2017.01) |

(Continued)

(52) U.S. Cl.
CPC ............. *B31B 70/00* (2017.08); *B31B 70/04* (2017.08); *B31B 70/18* (2017.08); *B31B 70/261* (2017.08); *B31B 70/644* (2017.08); *B31B 70/8132* (2017.08); *B31B 70/96* (2017.08); *B29C 48/13* (2019.02); *B29K 2023/00* (2013.01); *B29L 2031/727* (2013.01); *B31B 70/10* (2017.08); *B31B 70/98* (2017.08); *B31B 2150/00* (2017.08); *B31B 2160/10* (2017.08);

(Continued)

(58) Field of Classification Search
CPC ....... B31B 70/00; B31B 70/18; B31B 70/644; B31B 70/04; B31B 70/96; B31B 70/8132; B31B 70/261; B31B 2150/00; B31B 70/98; B31B 2160/102; B31B 70/10; B31B 2160/10; B65D 33/2508; B29C 48/13; B29K 2023/00; B29L 2031/727
USPC ........................................................ 493/196
See application file for complete search history.

(56) References Cited

U.S. PATENT DOCUMENTS 2,113,555 A   4/1938  Novick
2,444,685 A * 7/1948  Waters ................... B31B 70/00
                                                156/260

(Continued)

FOREIGN PATENT DOCUMENTS

CN   1671541 A   9/2005
CN   103909680 A  7/2014

(Continued)

OTHER PUBLICATIONS

International Search Report and Written Opinion cited in International Application PCT/US2017/014012 dated Apr. 19, 2017 (10 pages).

(Continued)

*Primary Examiner* — Sameh Tawfik

(57) ABSTRACT

A system and process for making a container or pouch that separates the cutting and sealing steps into two distinct steps with a separate step of rotating the container or pouch template 90 degrees relative to a direction of travel between the cutting and sealing steps.

24 Claims, 6 Drawing Sheets

(51) Int. Cl.
*B31B 70/64* (2017.01)
*B31B 70/26* (2017.01)
*B29C 48/13* (2019.01)
*B31B 160/10* (2017.01)
*B31B 70/98* (2017.01)
*B31B 70/10* (2017.01)
*B31B 150/00* (2017.01)
*B29K 23/00* (2006.01)
*B29L 31/00* (2006.01)
*B65D 33/25* (2006.01)

(52) U.S. Cl.
CPC ... *B31B 2160/102* (2017.08); *B31B 2160/106* (2017.08); *B65D 33/2508* (2013.01)

(56) References Cited

U.S. PATENT DOCUMENTS

| | | | | |
|---|---|---|---|---|
| 2,805,753 A * | 9/1957 | Palmer | | B65G 47/244 |
| | | | | 198/374 |
| 3,221,613 A | 10/1965 | Sanders | | |
| 3,534,520 A * | 10/1970 | Moran | | B65B 43/04 |
| | | | | 383/122 |
| 3,827,577 A * | 8/1974 | Kurk | | B65G 47/086 |
| | | | | 414/790 |
| 3,853,040 A * | 12/1974 | Achelpohl | | B65D 31/08 |
| | | | | 493/194 |
| 4,355,494 A * | 10/1982 | Tilman | | B29C 65/18 |
| | | | | 493/194 |
| 4,883,162 A * | 11/1989 | Flot | | B65G 47/244 |
| | | | | 198/374 |
| 4,945,713 A * | 8/1990 | Widenback | | B65B 43/123 |
| | | | | 493/198 |
| 5,025,910 A | 6/1991 | Lasure et al. | | |
| 5,176,244 A | 1/1993 | Radzins et al. | | |
| 5,281,081 A * | 1/1994 | Kato | | B65G 1/1378 |
| | | | | 414/789.6 |
| 5,405,561 A * | 4/1995 | Dais | | B26D 9/00 |
| | | | | 156/204 |
| 5,554,093 A * | 9/1996 | Porchia | | B44F 1/10 |
| | | | | 383/106 |
| 5,564,834 A * | 10/1996 | Porchia | | B65D 33/20 |
| | | | | 383/211 |
| 5,569,145 A * | 10/1996 | Achelpohl | | B31B 70/00 |
| | | | | 493/240 |
| 5,941,052 A * | 8/1999 | Evangelisti | | B65B 51/303 |
| | | | | 53/371.6 |
| 5,964,688 A | 10/1999 | Woody et al. | | |
| 6,032,782 A * | 3/2000 | Sampson | | B65G 47/244 |
| | | | | 198/374 |
| 6,055,462 A * | 4/2000 | Sato | | B25J 9/1687 |
| | | | | 700/217 |
| 6,126,383 A * | 10/2000 | Franklin | | B65G 47/086 |
| | | | | 198/374 |
| 6,195,967 B1 * | 3/2001 | Todd | | B29C 65/18 |
| | | | | 53/139.2 |
| 6,477,820 B1 * | 11/2002 | Dutra | | B65B 43/30 |
| | | | | 53/412 |
| 7,311,647 B2 * | 12/2007 | Delisle | | B29C 65/08 |
| | | | | 493/10 |
| 7,398,870 B2 | 7/2008 | McCabe | | |
| 8,511,458 B2 * | 8/2013 | Setozaki | | B65B 43/04 |
| | | | | 198/407 |
| 8,820,513 B2 | 9/2014 | Papsdorf et al. | | |
| 10,252,870 B2 * | 4/2019 | Kimoto | | B65G 57/22 |
| 2001/0029226 A1 | 10/2001 | Ichikawa et al. | | |
| 2002/0068668 A1 * | 6/2002 | Chow | | B31B 50/00 |
| | | | | 493/62 |
| 2014/0083061 A1 * | 3/2014 | Ibaraki | | B65B 3/02 |
| | | | | 53/558 |

FOREIGN PATENT DOCUMENTS

| | | |
|---|---|---|
| CN | 104590673 A | 5/2015 |
| DE | 102010012692 A | 9/2011 |
| EP | 0439897 B1 | 1/1994 |
| GB | 1064612 A | 4/1967 |
| JP | 62-052050 | 3/1987 |
| JP | H0471704 B2 | 11/1992 |
| JP | H0699525 A | 4/1994 |
| JP | H07101008 A | 4/1995 |
| JP | H07125112 A | 5/1995 |
| JP | H11129359 A | 5/1999 |
| JP | 2010083073 A | 4/2010 |
| KR | 10-2001-0088413 | 9/2001 |
| WO | 2004011238 A2 | 2/2004 |

OTHER PUBLICATIONS

First Office Action issued in corresponding Chinese Application No. 201780013428.1, dated Feb. 2, 2019, 10 pages.
Notification of Reasons for Refusal issued in corresponding Japanese Application No. 2018-537498, dated Jan. 29, 2019, 6 pages.
Grounds for Rejection issued in corresponding Korean Application No. 10-2018-7022512, dated Jul. 31, 2019, 16 pages.
Grounds for Rejection and English Translation, related Korean patent application No. 10-2018-7022512, dated Mar. 4, 2019, 16 pages.

\* cited by examiner

SYSTEM AND PROCESS FOR MAKING A POUCH OR CONTAINER

CROSS REFERENCE TO RELATED APPLICATIONS

This application claims the benefit of priority from U.S. Provisional Application No. 62/280,496, filed Jan. 19, 2016, the contents of which are incorporated herein by reference in their entirety.

REFERENCE REGARDING FEDERALLY SPONSORED RESEARCH OR DEVELOPMENT

Not applicable

SEQUENTIAL LISTING

Not applicable

BACKGROUND OF THE INVENTION

Field of the Invention

The present disclosure generally relates to a system and process for making a pouch or a container, and more particularly to making a bag, and even more particularly to making a zippered bag.

Description of the Background of the Invention

Conventional pouch or container forming systems rely on a folded web of thermoplastic material, or a web formed of blown, cast, monolayer, or co-extruded films as inputs, the inputs moving longitudinally through those systems. The web is cut perpendicular to the direction of motion to define separate pouches or containers and further to define the sides of adjacent pouches or containers. Simultaneously, or immediately after cutting, the systems form the side seals along the edges of the pouches or containers. Alternatively, other systems first seal the web between a set of heated jaws, before a blade disposed between the jaws is used to separate the film or web into separate pouches or containers.

Such conventional systems may utilize a combination cutting and sealing apparatus having a rotating drum and track assembly, where the track assembly may include clamping devices that travel around the track assembly and are designed to clamp the web of thermoplastic film between the drum and the track. Alternatively a polytetrafluoroethylene (PTFE) belt may be used to clamp the film to the drum. In either case, the film is held in place against the drum and, as the drum rotates, an electrically-heated hot wire or hot knife extends outward from the drum, cuts through the film in a direction perpendicular to the direction of travel, and moves into a gap between seal bars in order to seal and form the sides of the pouch or container, which also are perpendicular to the direction of travel. The wire may generate sufficient heat to melt the sides of the folded film layers or to plasticize the layers to a degree whereby the layers weld together in the area contacted by the wire.

The heating and sealing may require a predetermined dwell time during which the seal bars are in contact with the pouch or container sides in order to adequately seal each side. Dwell time, production rate, and physical system component dimensioning all may depend on the material being cut and sealed. Conventional systems may require a multi-story facility to accommodate the rotating drum, requiring significant capital expenditures if very high speeds are needed. Additionally, the rate of production and the strength of side seals are inversely proportional in these systems, as a longer dwell time may result in a stronger seal but at the expense of producing fewer pouches or containers per minute.

Outside the area of pouch and container forming systems, other manufacturing systems that exist rely on rotating one or more components during the manufacturing process in order to align those components with other components. Many of these systems relate to the assembly of diapers or feminine hygiene products and are concerned with rotating an absorbent layer for disposal on, and adherence to, an impervious layer. These systems are not concerned with rotation of a component comprising multiple layers, where the multiple layers eventually will be joined to one another, such that precise relative positioning of the multiple layers is required.

Therefore, a need exists for a system and method for forming a thermoplastic pouch or container that alleviates one or more of the problems associated with, or particular to, existing bag-forming systems.

SUMMARY OF THE INVENTION

The present disclosure overcomes some of the aforementioned drawbacks by providing a system and process for making a pouch or container that separates the cutting and sealing steps into two distinct steps with a separate step of rotating a pouch or container template relative to the direction of travel between the cutting and sealing steps. In one aspect, e.g., to form a rectangular container or pouch, the template may be rotated 90 degrees. In another aspect, the template may be rotated by a non-90 degree amount, i.e., by an acute or obtuse angular amount, to form a container or pouch having a parallelogram, trapezoidal, or other non-rectangular shape.

According to one aspect, a system for making a container includes a cutter configured to cut a folded web of thermoplastic material in a direction transverse to a first direction of travel of the folded web into a plurality of container templates, each container template having a first opposing wall and a second opposing wall. A seam is defined by a junction of the first opposing wall and the second opposing wall and opposing first and second upper ends of the first and second walls, respectfully, are defined opposite the seam. Further, each container includes a first side and a second side defined between the seam and the opposing first and second upper ends. A turner is configured to rotate each container template to orient the first side and the second side along a second direction of travel. The system also includes a sealer that is configured to seal one or both of the first side and the second side. Moreover, the system may employ static or small spot welds or use a glue or other adhesive to stabilize the first and second opposing walls relative to one another, after being cut but before application of the sealer.

According to another aspect, a system for making a zippered bag includes a cutter configured to cut a folded web of thermoplastic material in a direction transverse to a first direction of travel of the folded web into a plurality of bag templates, each bag template having a first opposing wall and a second opposing wall. A seam is defined by a junction of the first opposing wall and the second opposing wall and interfacing zipper profiles are defined opposite the seam. Further, each bag includes a first side and a second side defined between the seam and the interfacing zipper profiles. A turner is configured to rotate each bag template to orient the first side and the second side along a second direction of travel. The system also includes a sealer that is configured to seal one or both of the first side and the second sides, concurrently or staggered.

According to yet another aspect, a process for making a container includes the step of cutting a folded web of thermoplastic material in a direction transverse to a first direction of travel of the folded web into a plurality of container templates, each container template having a first opposing wall and a second opposing wall. A seam is defined by a junction of the first opposing wall and the second opposing wall and opposing first and second upper ends of the first and second walls, respectfully, are defined opposite the seam. Further, each bag includes a first side and a second side defined between the seam and the opposing first and second upper ends. The process also includes the steps of rotating each container template to orient the first side and the second side along a second direction of travel and sealing one or both of the first side and the second side.

According to still another aspect, a system for making a container includes a cutter configured to cut a pair of half-webs of thermoplastic material in a direction transverse to a first direction of travel of the half-webs into a plurality of container templates. Each container template has a first opposing wall and a second opposing wall. Opposing first and second upper ends of the first and second walls, respectfully, oppose first and second lower ends of the first and second walls, respectfully. Further, a first side and a second side are defined between the opposing first and second upper ends and the opposing first and second lower ends. A turner is configured to rotate each container template to orient the first side and the second side along a second direction of travel. The system also includes a first sealer configured to seal the first lower end to the second lower end and a second sealer configured to seal one or both of the first side and the second side.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

Figure 1:
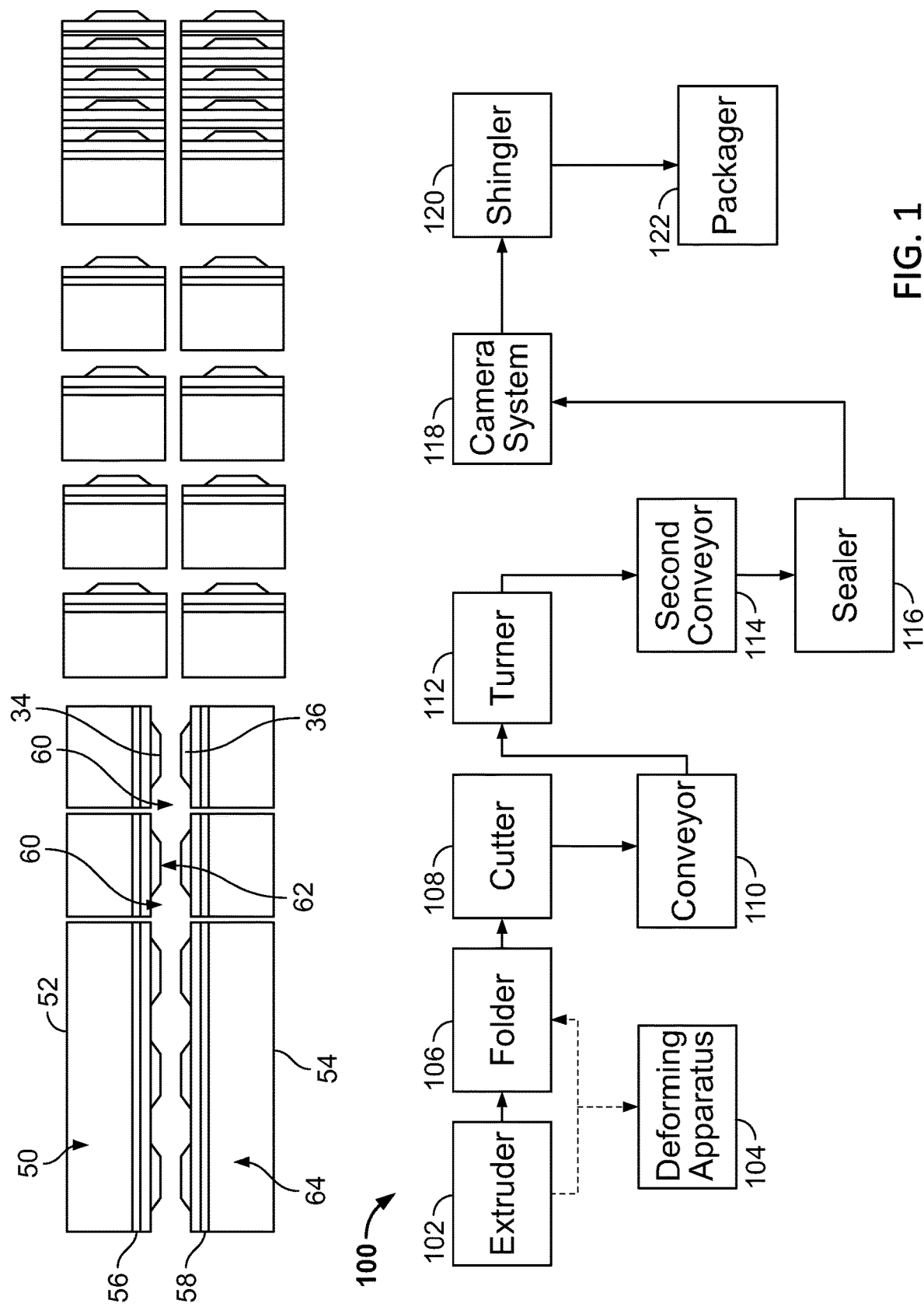
FIG. 1 is a top view block diagram depicting various components of a system for making a container or pouch and, in a particular embodiment, a reclosable zippered bag.

With reference to FIG. 1, one particular embodiment of a system 100 for making a container or pouch is illustrated. It is contemplated that the present system 100, and the accompanying disclosure herein, may be utilized to manufacture, form, or otherwise produce any type of container, including, for example, a pouch such as a bag with or without a closure mechanism, a zippered bag, a slider bag, a drawstring bag, or any other type of pouch that is unsealable, sealable, and/or resealable. Further, containers may broadly encompass any type of component made from a web of thermoplastic material fashioned into an end product for use by a consumer or industrial user. For purposes of describing the present system, and method for making containers and pouches with the present system, a particular example of making a reclosable zippered bag 10 will be illustrated; however, one of ordinary skill will understand that the presently disclosed system and method may encompass other containers and pouches as noted herein.

Figure 2:
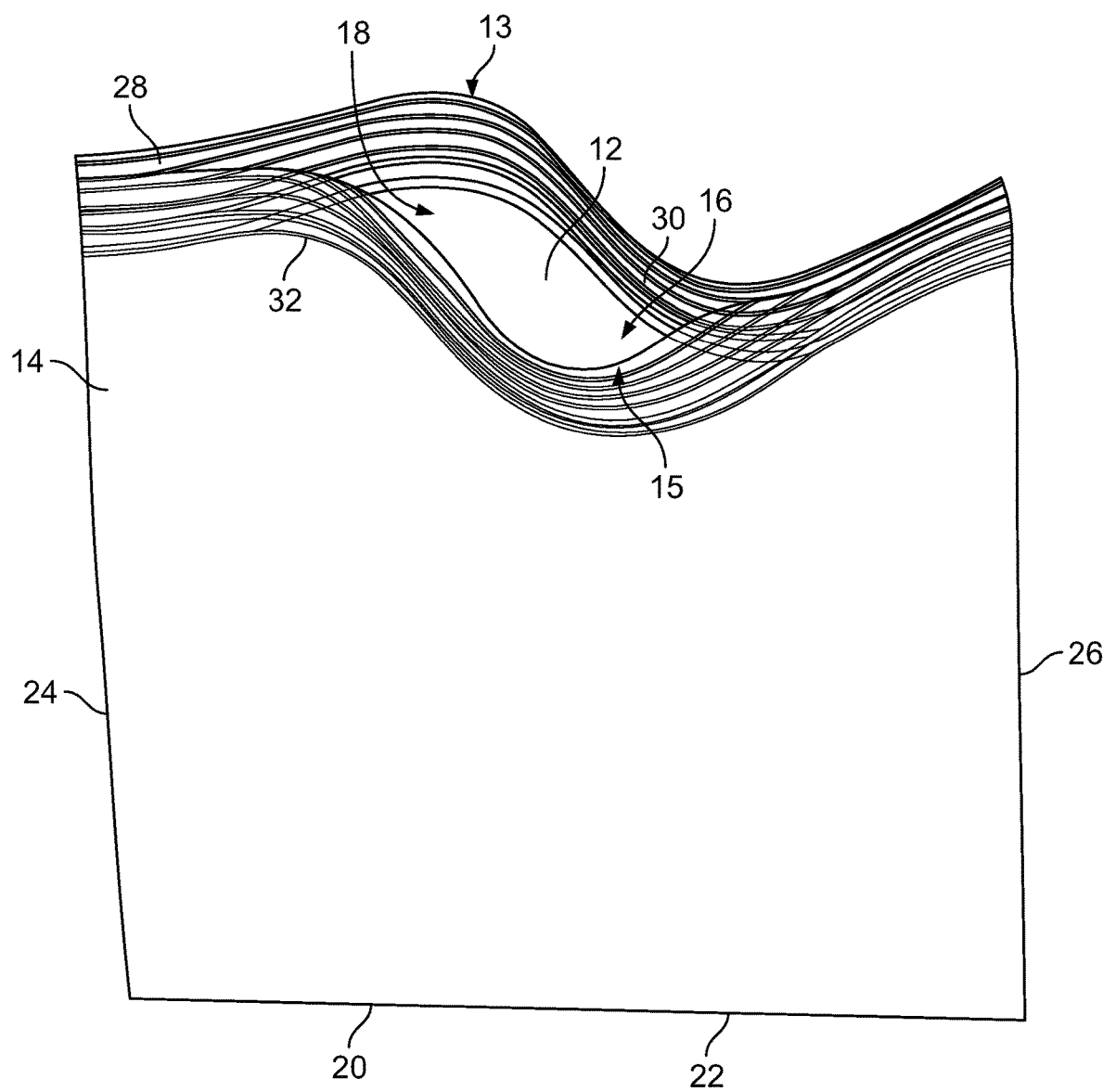
FIG. 2 is an isometric view of one example of a zippered bag.

With reference to FIG. 2, the zippered bag 10 includes a first opposing wall 12 and a second opposing wall 14 at least partially sealed proximate a first upper end 13 and a second upper end 15, respectively, to define an interior 16 and a mouth 18 for access to the interior 16. As described in greater detail below, the first and second opposing walls 12, 14 may be formed from a continuous web 50 of material folded at a seam 20 defining a closed end 22 of the zippered bag 10 opposite the mouth 18. Also as described below, the interior 16 is formed by sealing the first and second opposing walls 12, 14 at a first side 24 and a second side 26. In one aspect, the bag 10 further includes a zipper 28 disposed along the mouth 18, the zipper 28 defining a rib (or male) profile 30 and a groove (or female) profile 32, where the rib profile 30 and the groove profile 32 interlock to provide a seal. Alternatively, the bag 10 may include a fold top closure, a slider sealer, a hook-and-loop-type sealer, or an adhesive to at least partially seal the mouth 18. A tab 34, 36 disposed between mouth 18 and one or both of the rib profile 30 and groove profile 32 may assist in opening the bag 10. In one aspect, the bag 10 may be made of a thermoplastic material, e.g., polyethylene, polypropylene, or another thermoplastic, as would be appreciated by those of ordinary skill in the pertinent art. In another aspect, the bag 10 may be made of a plurality of materials, as in the case of a co-extruded film that includes a sealable inner layer.

Additionally, as would be appreciated by those of ordinary skill in the pertinent art, the subject technology is applicable to any type of bag, pouch, package, and various other storage containers, e.g., snack, sandwich, quart, and gallon size bags. The subject technology is also adaptable to bags having double zipper, or multiple zipper, or other type of closure mechanisms. Moreover, although the system 100 is described herein with respect to a single web 50 of thermoplastic material, the system 100 and its various components alternatively may be configured to process a plurality of webs concurrently. For example, the system may have a "2-up" configuration, in which a pair of webs are processed through the system at the same time, e.g., side-by-side in a mirror-image arrangement.

Returning to FIG. 1, in one aspect, the system 100 receives a web 50 of thermoplastic as an input material. The web 50 may be provided on rolls or, alternatively, is cast or blown in line. The system 100 includes an extruder 102 configured to receive the web 50 and continuously form the rib profile 30 and groove profile 32 from the web material, itself, proximate opposing longitudinally extending sides 52, 54 of the web 50. In another aspect, one or both of the rib profile 30 and groove profile 32 may be formed separately, e.g., as a strip or pair of strips, and may be fixedly coupled to the web 50. Coupling may be achieved using an adhesive, sonic welding, heat sealing, belly bands, or any other technique recognized by those of ordinary skill in the pertinent art. In still another aspect, the system may receive two half-webs of the same or different composition either already containing or being modified to include a respective rib profile 30 and groove profile 32 to be mated, where the seam 20 between the half-webs is sealed at some point in the manufacturing process, e.g., at the same time the sides are sealed.

The web 50 may include texturized surfaces 56, 58 disposed, respectively, between the longitudinally extending sides 52, 54 and the rib profile 30 and groove profile 32. The texturized surfaces 56, 58 may act as grip strips to increase friction in order to assist a user in opening the bag 10. Additionally, one or more notches 60 may be cut from the web 50 in the areas between the longitudinally extending sides 52, 54 and the rib profile 30 and groove profile 32. An area 62 longitudinally aligned with the notches 60 and remaining after the notches 60 are cut may define the one or more tabs 34, 36. The texturized surfaces 56, 58 may be formed on the web 50, and the notches 60 may be cut from the web 50 before, after, or concurrently with the forming of the rib profile 30 and the groove profile 32.

The system optionally includes a deforming apparatus 104, which may include a deforming ring or other structure for deforming a portion of one or both of the rib profile 30 and groove profile 32. Deforming apparatus 104 may be used to provide discontinuities or other variations in the profile(s) 30, 32 that may affect closing characteristics such as actual or perceived closing sufficiency, amplitude of sound, type of sound, and texture or feel generated during closing of the zipper 28.

Continuing with the production of bag 10, the system 100 includes a folder 106 configured to fold the web 50, thereby forming the first opposing wall 12 and second opposing wall 14, as well as the seam 20 along the fold line. In one aspect, the folder 106 folds the web 50 substantially in half in a longitudinal direction, such that the rib profile 30 and groove profile 32 are equidistantly spaced from the seam 20. The folder 106 also may be configured to interlock the rib profile 30 and groove profile 32 at this stage. As such, the web 50 forms a continuous tube 64, although the first opposing wall 12 and the second opposing wall 14 may be in contact across substantially all of their surfaces, such that the tube 64 is collapsed as it travels downstream of the folder 106. One example of a folder 106 is a slitter defining a plow, although other folders may be implemented, as would be appreciated by those of ordinary skill in the pertinent art. It is also contemplated that additional shift regions may be made to the web 50 at this stage or later through the application of indentations, scores, or crimps, which could be used, for example, to allow a bag to have both a flat configuration and a stand-up configuration.

In one aspect, the folded web 50 may be customized by printing one or more indicia on one or both of the first and second opposing walls 12, 14 at predetermined intervals. Indicia may include, e.g., logos, writable surfaces, volumetric fill lines or other indicators, etc. Indicia may be applied pre-folding, post-folding but pre-cutting (the cutting being described below), or post-folding and post-cutting. In still another aspect, indicia may not be applied to the web 50. In yet another aspect, customizing may include adding sliders, stickers, embossing, scoring, or other decorative and/or functional attributes to the bag 10.

In preparation for cutting of the web 50, as described in greater detail below, static welds, spot welds, a glue or other adhesive, etc., may be added at predetermined intervals in order to hold a shape of the tube 64 prior to, during, and after the mechanical cut. The welds or adhesive may be added proximate the future locations of the first side 24 and second side 26 so as to maximize an uninterrupted volume of the interior 16. As a benefit, the web 50 may be kept intact until the sealer (also described below), where the walls are then severed from one another and sealed making individual bags to be placed into the dispensers. As compared to conventional bag-making devices, the present bags 10 are cut into individual parts much earlier in the system than the sealer. The welds and/or adhesives then may prevent problems from occurring that would render a bag unsatisfactory by quality assurance standards, e.g., tension changes, film slippage, and zipper blips.

The system 100 also includes a cutter 108 configured to cut the web 50 at predetermined intervals in order to convert the continuous web 50 into a plurality of bags 10, albeit ones with unsealed sides at this stage. In one aspect, the system 100 employs a mechanical cutter 108, which may cut across a transverse dimension of the first and second opposing walls 12, 14 progressively, e.g., using a straight cutter or a rolling cutter moving in the transverse direction, or all at once, using a cleaver moving perpendicular to the walls 12, 14. Other types of cutters 108, e.g., a supported hot wire, a laser cutter, etc., may be employed, although a mechanical cutter may be preferred because it may be used at a lower temperature, requiring less energy input to the system. Additionally, a mechanical cutter may avoid material degradation along each cut line and may have a shorter dwell time as compared to other cutters, thereby increasing production rates.

Figure 5:
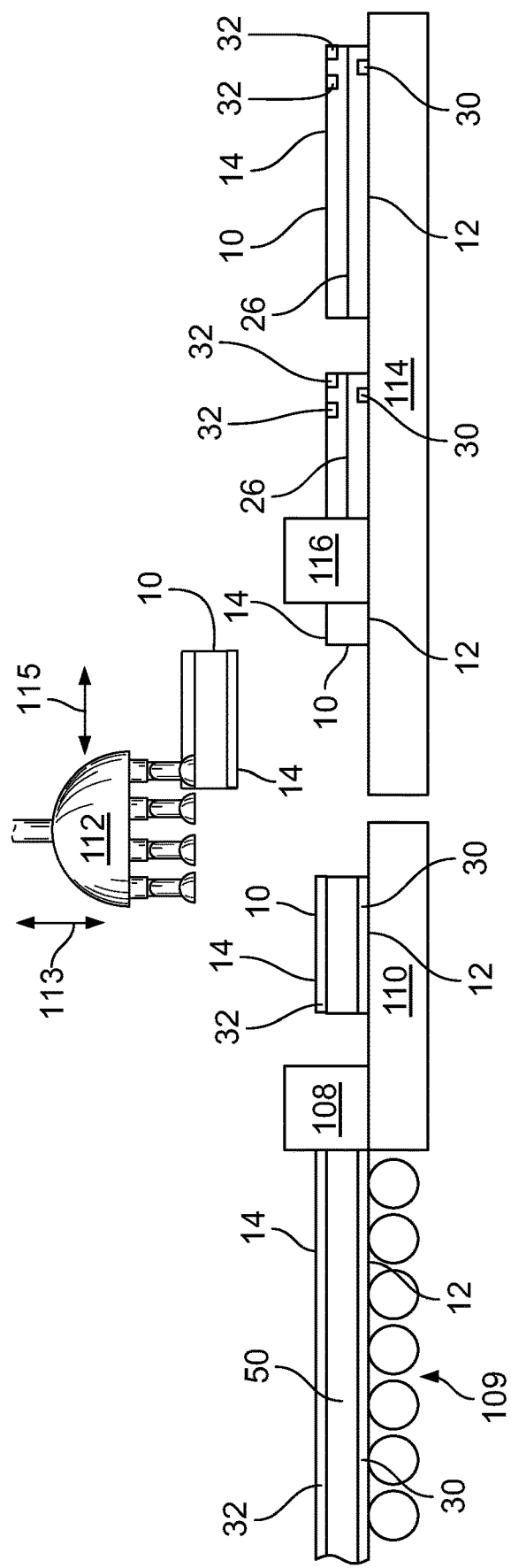
FIG. 5 is a schematic side view of a portion of the system for making a container or pouch of FIG. 1.

With reference to FIG. 5, prior to being cut, the web 50 may be supported through the system by a plurality of rollers 109 that apply and/or maintain a desired tension within the web 50. After being cut, the individual bags may be carried through the system 100 on one or more conveyors 110. The system 100 may employ a vacuum in order to keep each bag 10 in a predetermined position on each conveyor 110. Alternatively, mechanical, electrostatic, adhesive, or other techniques recognized by those of ordinary skill in the pertinent art may be employed to fix each bag 10 in place relative to a conveyor 110.

With reference to FIGS. 1 and 5, after being cut, but before the first side 24 and second side 26 are sealed, each bag 10 is fed to a turner 112, which picks up the bag 10 from the conveyor 110 (as indicated by arrow 113), rotates it, repitches it, and deposits it on at least one second conveyor 114 (as indicated by arrow 113 and arrow 115). Bags from a single pre-turning conveyor may be deposited onto multiple post-turning conveyors, e.g., to be directed pre-sealing or post-sealing to multiple bagging or boxing subassemblies, which may permit those post-turning conveyors to move more slowly than the pre-turning conveyor. Alternatively, the post-turning conveyors may move at the same speed as, or faster than, the pre-turning conveyor. In one aspect, the turner 112 may complete its rotation before or at the same time as placing bag 10 on conveyor 114. In another aspect, the turner 112 may complete its rotation after placing bag 10 on conveyor 114, although the turner 112 also may experience a rotational pause for a predetermined interval before, during, and after the bag 10 is placed on the conveyor 114.

With reference to FIG. 1, in one aspect, the production line may be generally linear, such that the bag 10 is turned 90 degrees. More generally, and regardless of the direction of the production line, the bag 10 is turned such that the first side 24 and the second side 26 transition from moving perpendicular to a direction of travel to parallel to a direction of travel, i.e., the bag 10 may be rotated approximately 90 degrees relative to its direction of motion, while an absolute angle of rotation may vary depending on an input angle of conveyor 110 and an output angle of conveyor 114. In yet another aspect, the bag 10 may be rotated relative to its direction of motion by an amount other than 90 degrees, the effect being to form a non-rectangular, parallelogram-shaped or trapezoidal-shaped bag 10.

With reference to FIGS. 1 and 5, the turner 112 may rely upon one or more of a vacuum or series of vacuums, electrostatic forces, frictional or adhesive forces, or other methods of securement to prevent the bag 10 from moving relative to the turner. Releasing of vacuum and/or application of a positive fluid pressure may be relied upon for depositing rotated bags onto the conveyor 114.

Figure 6:
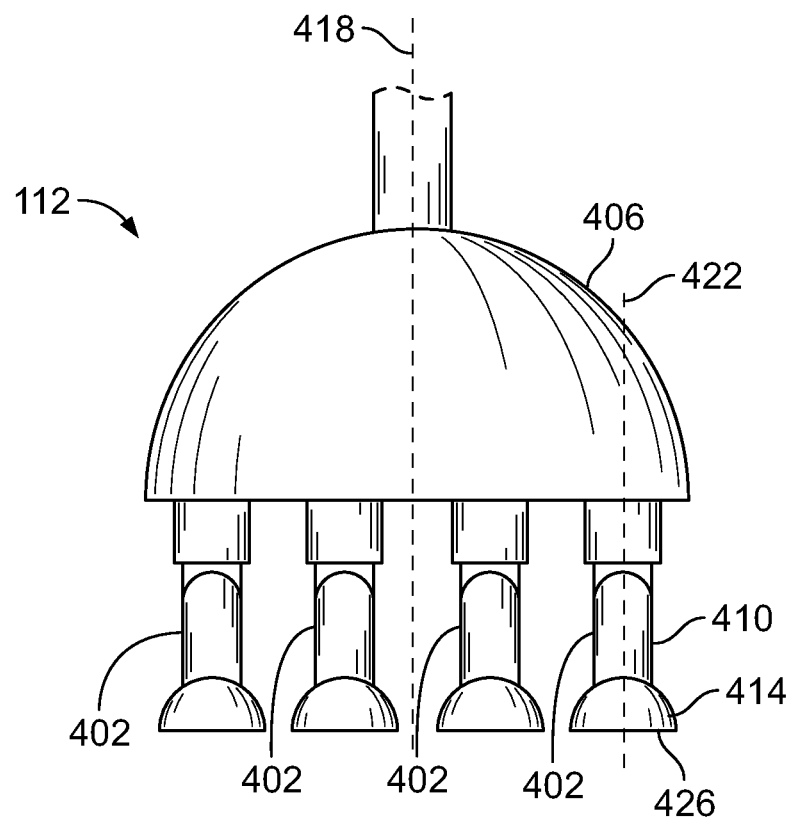
FIG. 6 is a side view of the turner of FIGS. 1 and 5.
Figure 7:
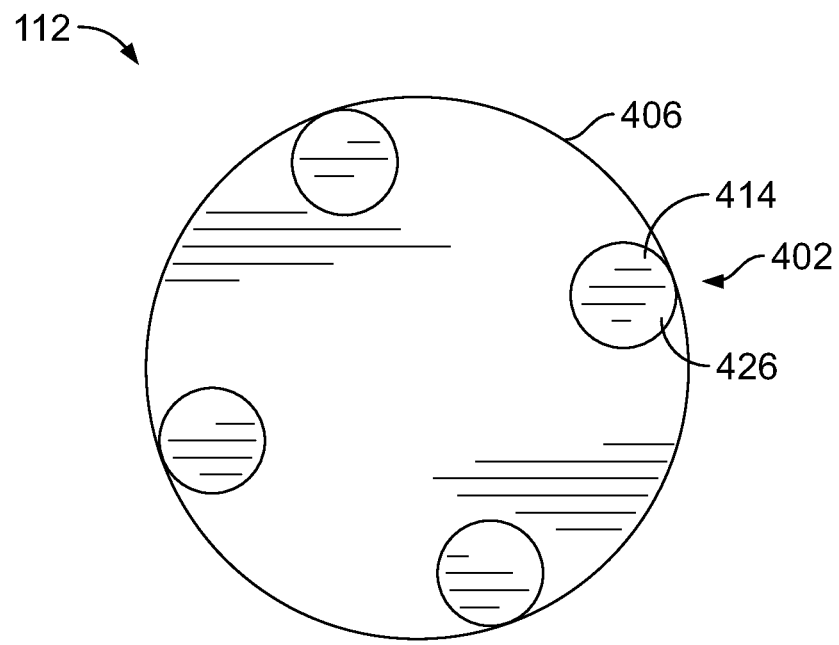
FIG. 7 is a bottom view of the turner of FIGS. 1, 5, and 6.

With reference to FIGS. 6 and 7, in one aspect, the turner 112 may include a plurality of rotator assemblies 402 disposed about a central hub 406, where each rotator assembly 402 may include a shaft 410 extending between the central hub 406 and a distal end 414. In this aspect, each rotator assembly 402 rotates about a first axis of rotation 418 defined to be the axial direction of the central hub 406, and each rotator assembly 402 distal end 414 rotates about a second axis of rotation 422 defined to be parallel to the shaft 410. The shaft 410 may telescope or, alternatively, may have a fixed length. The distal end 414 may rotate relative to the shaft 410 or with the shaft 410, relative to the central hub 406. Other than rotating, the distal end 414 may be fixed with respect to the shaft 410 or, alternatively, may pivot angularly relative to the shaft 410. The distal end 414 may have a bag-contacting surface 426 that is generally planar, convex, or another shape. Other variations to this turner 112, or other turner variants, generally, may be implemented, as would be appreciated by those of ordinary skill in the pertinent art.

With reference to FIG. 1, after being turned, each bag 10 may interact with a sealer 116 to seal each of the first side 24 and the second side 26. One or more of direct conducting heat, convective heat (e.g., hot air, e.g.), ultrasonic sealing, laser or other radiation-based sealing, an adhesive, or another sealing method may be used. The sealer 116 may include a clamp, a vacuum, and/or another apparatus for keeping the first opposing wall 12 and the second opposing wall 14 together and stationary relative to one another during sealing. In one aspect, the sealer 116 may remain stationary as the bag 10 moves longitudinally past it, in which case rotation of the bag 10 simplifies the sealing process. In another aspect, the sealer 116 may move longitudinally with the bag 10, which may increase dwell time and thereby increase sealing strength. In still another aspect, the sealer 116 may move perpendicular relative to the first side 24 and/or second side 26 while either remaining stationary longitudinally or while also moving longitudinally. Perpendicular motion of the sealer 116 may permit the formation of shaped seals, e.g., curvilinear seals or seals non-parallel to the longitudinal direction of travel. Alternatively, perpendicular motion of the sealer 116 for at least one side of the bag 10 may result in the production of narrower bags, simplifying size changes and speeding up reconfiguration of the system 100 to produce bags of differing sizes and/or volumes.

It surprisingly was found that separating the combined cutting and sealing steps of conventional bag-forming systems into separate steps and adding an additional turning step in between actually simplified the overall bag-forming system 100 and required a smaller, less complex machine. Unlike with the rotary cutter and sealer of existing systems, sealing in system 10 may occur during linear motion, so different dwell times corresponding to different bag materials and/or sealing methods may be accounted for by changing a linear length of one or more system components, e.g., the second conveyor 114. As such, the system 100 may be easily adaptable to accommodate differing dwell times. For example, a longer dwell time can be achieved without decreasing production speed by placing the bags in a sealing loop where they remain in contact with the sealer 116, e.g., traveling in circles, until the desired contact time is met.

As compared to existing rotary drum combination cutter/sealers, sealer 116 may be applied while bag 10 is on the second conveyor 114, which may be disposed generally horizontally within a facility. Thus, the system 100 may not require a facility having as large a ceiling clearance as is necessary for those rotary systems, in which facility volume is necessary in order to have the necessary dwell time.

After being sealed, each bag 10 may progress through a quality review step. In one aspect, a camera system 118 may inspect each bag to verify that the interlocked rib profile 30 and groove profile 32 form a seal across their length, to verify that each bag has the correct predetermined dimensions, and/or that each of the first side 24 and second side 26 are sealed completely. Bags failing the quality review step may be eliminated from the process. Bags passing the quality review step may be counted to ensure that a correct number are bundled together and that no additional product is lost.

After quality review, the bags 10 may be directed to a shingle 120, reducing a linear speed of each bag to a scrub speed. A predetermined number of bags 10 are counted and then transferred as a bundle to a flighted conveyor or star wheel, which deposits each bundle to a packager 122, which packages the bundle into a consumer dispenser, e.g., a box. Another benefit of rotating the bags 10 is that the zipper 28 of each bag 10 is oriented as a leading edge, such that the bags are naturally oriented as desired for packaging.

Figure 3:
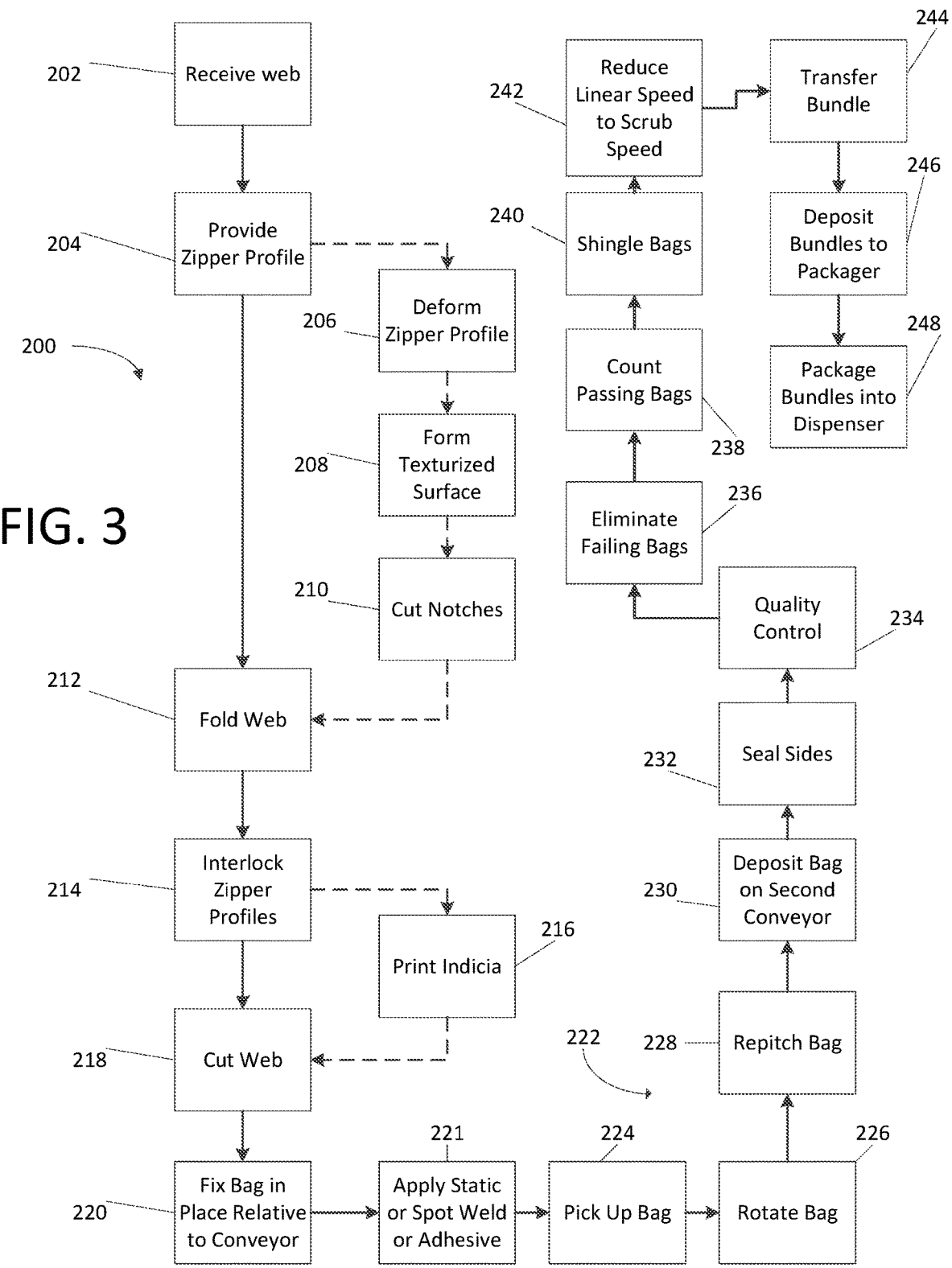
FIG. 3 is a flow diagram depicting one aspect of a process for making a container or pouch and, in a particular embodiment, a reclosable zippered bag.

With reference to the system 100 described above and to FIG. 3, a process 200 for making a zippered bag includes the steps of receiving 202 a web 50 of thermoplastic as an input material, and providing 204 opposing zipper profiles, e.g., a rib profile and a zipper profile, on longitudinally extending sides 52, 54 of the web 50. In one aspect, the providing step 204 includes continuously forming the zipper profiles from the web material, itself. In another aspect, the providing step 204 includes fixedly coupling separately formed zipper profiles to the web 50. The providing step 204 also may include the step of deforming 206 a portion of one or both of the rib profile 30 and groove profile 32 in order to provide discontinuities or other variations in the profile(s) 30, 32.

Before, concurrently with, or after providing the zipper profile, the process 200 optionally may include the steps of forming 208 texturized surfaces 56, 58 disposed, respectively, between the longitudinally extending sides 52, 54 and the rib profile 30 and groove profile 32, and cutting 210 one or more notches 60 from the web 50 in the areas between the longitudinally extending sides 52, 54 and the rib profile 30 and groove profile 32 to form one or more tabs 34, 36. Additionally, before, concurrently with, or after providing the zipper profile, the process 200 may also include the steps of forming 208 a texturized surface, a pattern, and/or an embossed surface, on one or more of the first and second walls 12, 14.

The process 200 further includes the step of folding 212 the web 50, thereby forming the first opposing wall 12 and the second opposing wall 14, as well as the seam 20 along the fold line. The folding 212 step also may include interlocking 214 the rib profile 30 and groove profile 32. The process 200 optionally also may include printing 216 one or more indicia on one or both of the first and second opposing walls 12, 14 at predetermined intervals.

Following the folding step 212, the process 200 includes cutting 218 the web 50 at predetermined intervals in order to convert the continuous web 50 into a plurality of bags 10 and fixing 220 each bag in place relative to a conveyor 110, e.g., using a vacuum. The process 200 also may include the step of applying 221 one or more of a static weld, a spot weld, a glue, or another adhesive to portions of each bag, in order to keep the first and second opposing walls 12, 14 together and properly oriented.

Next, the process 200 includes the step of turning 222 each bag such that the first side 24 and the second side 26 transition from moving perpendicular to a direction of travel to parallel to a direction of travel. The turning 222 step may include picking 224 up the bag 10 from the conveyor 110, rotating 226 it, repitching 228 it, and depositing 230 it on at least one second conveyor 114.

After being turned, the process 200 includes sealing 232 each of the first side 24 and the second side 26, e.g., using one or more of direct conducting heat, convective heat (hot air, e.g.), ultrasonic sealing, laser or other radiation-based sealing, an adhesive, a belly band (i.e., a strip of hot PE film), or another sealing method.

In another aspect, multiple operations (e.g., sealing, shaping, detailing, and/or tab formation) may be done substantially concurrently using one or more methods (e.g., all via ultrasonics or some via ultrasonics, while others are performed using convective heat).

After being sealed, the process 200 may include reviewing 234 each bag 10 for compliance with predetermined quality standards, eliminating 236 bags failing the quality reviewing 234 step, and counting 238 bags passing the quality review step.

After the reviewing 234 step, the process may include directing 240 the bags 10 to a shingle 120, reducing 242 a linear speed of each bag to a scrub speed, transferring 244 a bundle to a flighted conveyor or star wheel, depositing 246 each bundle to a packager 122, and packaging 248 the bundle into a consumer dispenser.

Figure 4:
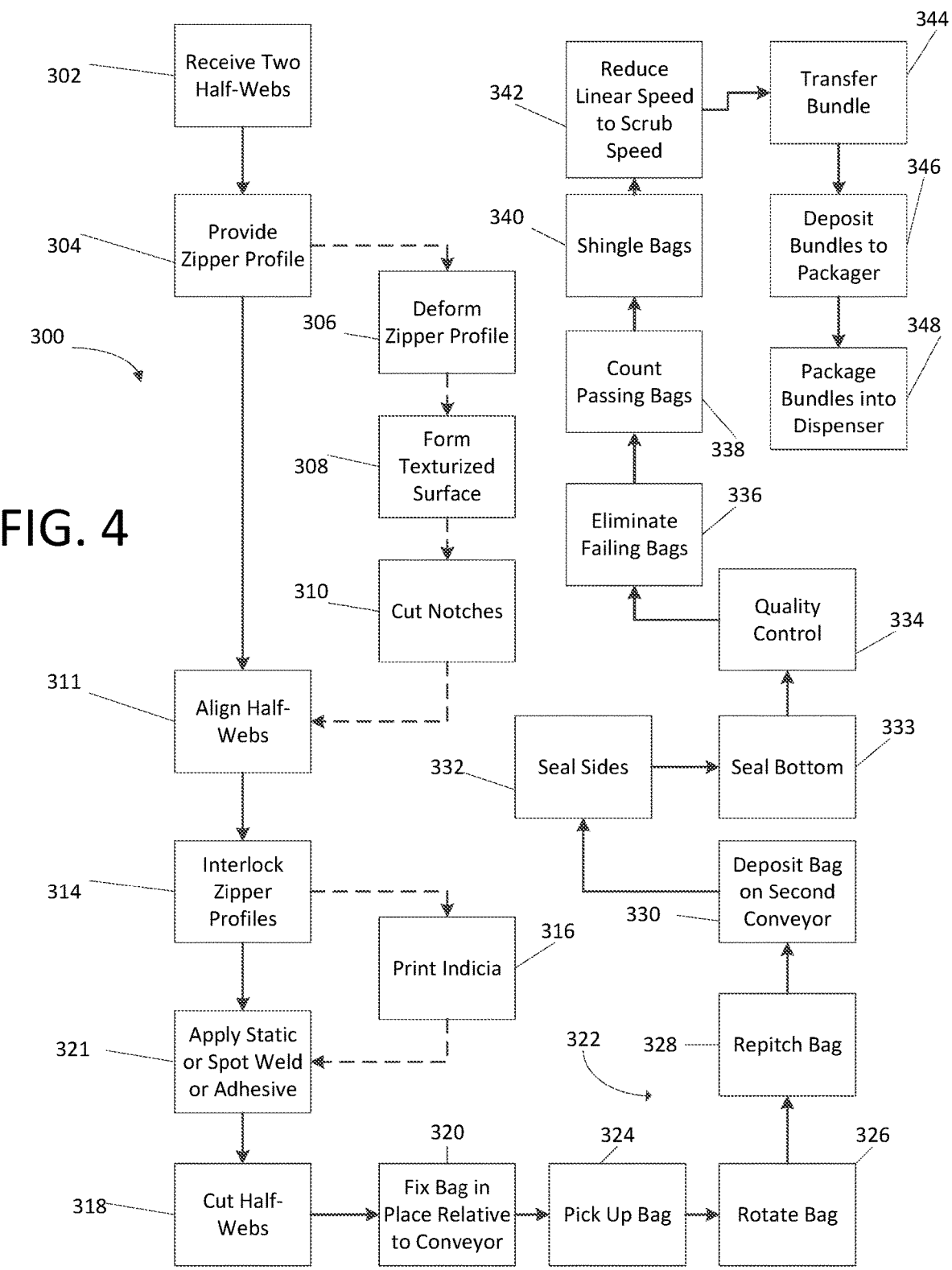
FIG. 4 is a flow diagram depicting another aspect of a process for making a container or pouch and, in a particular embodiment, a reclosable zippered bag.

As described above, instead of receiving a single, folded web 50, another aspect of the system may be configured to receive two half-webs of the same or different composition. As seen in FIG. 4, the process of making a bag from two half-webs may be substantially similar to the process depicted in FIG. 3 and described above for making a bag from a single, folded web. Similar steps between the two aspects may be represented by similar reference numerals, with the folded web process steps having a 200s prefix and the joined half-web profile steps having a 300s prefix. For the sake of brevity, only the differences between the two processes are discussed here. Thus, process 300 may include the step 302 of receiving two separate half-web pieces that, initially, are not joined to one another. Instead of folding a single web to form the first and second opposing walls 12, 14, the process 300 may include the step of aligning 311 the half-webs with respect to one another. In addition, the step of applying 321 static welds, spot welds, glue, or another adhesive between the half-webs may occur at the same time as in process 200, or it may occur earlier in the process 300, e.g., prior to cutting 318 the half-webs to form a plurality of individual bag templates, which may help keep the half webs more closely aligned throughout the steps that follow, despite the lack of an integral seam. As seen in FIG. 4, the step of sealing 333 the bottom may occur around the same time as the step of sealing 332 the sides. In various aspects, sealing 333 the bottom may occur before, concurrent with, or after sealing 332 the sides. In still another aspect (not shown), sealing 333 the bottom may occur at or around the same time as applying 321 the welds or adhesives. It is also contemplated that additional web material may be provided in the aforementioned steps between the first and second walls, which could, for example, include gussets or pleats to provide for an expandable bag.

INDUSTRIAL APPLICABILITY

The system and process described herein advantageously make containers or pouches using a smaller machinery footprint than conventional methods while increasing the maximum output of containers or pouches and simplifying the modification for multiple size manufacturing.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the application are reserved. All patents and publications are incorporated by reference.

We claim:

1. A system for making a container, comprising:
   a cutter configured to cut a folded web of thermoplastic material in a cutting direction transverse to a first direction of travel of the folded web to produce a plurality of container templates, each container template having a first opposing wall and a second opposing wall, a seam defined by a junction of the first opposing wall and the second opposing wall, opposing first and second upper ends of the first and second walls, respectively, defined opposite the seam, and a first side and a second side defined between the seam and the opposing first and second upper ends;
   a turner downstream of the cutter, the turner including
      a hub, and
      a rotator assembly engaged with the hub, the rotator assembly including
         a rotatable shaft extending downwardly from the hub, rotatably engaged with the hub about a first axis extending through the rotatable shaft, and having a distal end, and
         a bag-contacting surface connected to the distal end, wherein the turner is configured to
      engage a top exterior side of each container template via the bag-contacting surface,
      vertically pick up each container template via the bag-contacting surface,
      horizontally rotate each container template about the first axis via the rotatable shaft,
      horizontally translate each container template via the hub, and
      vertically deposit each container template along a second direction of travel via the bag-contacting surface, wherein the bag-contacting surface engages the top exterior side via one or more of a vacuum, electrostatic forces, and adhesion to prevent the container template from moving relative to the bag-contacting surface; and
   a sealer downstream of the turner configured to seal one or both of the first side and the second side in a sealing direction parallel with the second direction of travel.

2. The system of claim 1, wherein the first direction of travel is defined by a first conveyor and the second direction of travel is defined by a second conveyor.

3. The system of claim 1, wherein the cutter is a mechanical cutter.

4. The system of claim 1, further comprising a vacuum conveyor to transport each container template from the turner to the sealer.

5. The system of claim 1, further comprising at least one of a static welder, a spot welder, or an adhesive applier upstream of the sealer and configured to apply one or more static welds, spot welds, or adhesive portions, respectively, to each container template to maintain a shape of each container template.

6. The system of claim 1, wherein the sealer applies at least one of direct conducting heat, convective heat, ultrasonic sealing, laser or other radiation-based sealing, or an adhesive to one or both of the first side and the second side.

7. The system of claim 1, wherein the sealer includes one or more positionable sealing heads movable transverse to the second direction of travel.

8. The system of claim 1, wherein each container template has interfacing zipper profiles defined opposite the seam.

9. A system for making a container, comprising:
a cutter configured to cut a pair of half-webs of thermoplastic material in a cutting direction transverse to a first direction of travel of the half-webs to produce a plurality of container templates, each container template having a first opposing wall and a second opposing wall, opposing first and second upper ends of the first and second walls, respectively, opposing first and second lower ends of the first and second walls, respectively, and a first side and a second side defined between the opposing first and second upper ends and the opposing first and second lower ends;
a turner downstream of the cutter, the turner including
a hub,
a rotator assembly engaged with the hub, the rotator assembly including
a rotatable shaft extending downwardly from the hub, rotatably engaged with the hub about a first axis extending through the rotatable shaft, and having a distal end, and
a bag-contacting surface connected to the distal end, wherein the turner is configured to
engage a top exterior side of each container template via the bag-contacting surface,
vertically pick up each container template via the bag-contacting surface,
horizontally rotate each container template about the first axis via the rotatable shaft,
horizontally translate each container template via the hub, and
vertically deposit each container template along a second direction of travel via the bag-contacting surface, wherein the bag-contacting surface engages the top exterior side via one or more of a vacuum, electrostatic forces, and adhesion to prevent the container template from moving relative to the bag-contacting surface;
a first sealer downstream of the turner configured to seal the first lower end to the second lower end in a first sealing direction intersecting the second direction of travel; and
a second sealer downstream of the turner configured to seal one or both of the first side and the second side in a second sealing direction parallel with the second direction of travel.

10. The system of claim 9, wherein the first sealer and the second sealer are the same sealer.

11. The system of claim 9, wherein the first sealer is adjacent to the second sealer.

12. The system of claim 9, wherein a seam is defined by a junction of the opposing first and second lower ends, and each container template has interfacing zipper profiles defined opposite the seam.

13. The system of claim 9, wherein the cutter is a mechanical cutter.

14. The system of claim 9, further comprising a vacuum conveyor to transport each container template from the turner to the first sealer and to the second sealer.

15. The system of claim 9, further comprising at least one of a static welder, a spot welder, or an adhesive applier upstream of the first sealer and the second sealer and configured to apply one or more static welds, spot welds, or adhesive portions, respectively, to each container template to maintain a shape of each container template.

16. The system of claim 9, wherein the first sealer and the second sealer, respectively, apply at least one of direct conducting heat, convective heat, ultrasonic sealing, laser or other radiation-based sealing, or an adhesive to the first side and the second side.

17. The system of claim 9, wherein at least one of the first sealer and the second sealer include a positionable sealing head transversely movable relative to the second direction of travel.

18. A system for making a container, comprising:
a cutter configured to cut a thermoplastic film web in a cutting direction transverse to a first travel direction of the thermoplastic film web to produce a plurality of container templates, each of the container templates having opposing first and second ends and opposing first and second sides, the first and second sides being formed by the cutter;
a turner downstream of the cutter, the turner including
a hub, and
a rotator assembly engaged with the hub, the rotator assembly including
a rotatable shaft extending downwardly from the hub, rotatably engaged with the hub about a first axis extending through shaft, and having a distal end, and
a bag-contacting surface connected to the distal end, wherein the turner is configured to
engage a top exterior side of each container template via the bag-contacting surface,
vertically pick up each container template via the bag-contacting surface,
horizontally rotate each container template about the first axis via the rotatable shaft,
horizontally translate each container template via the hub, and
vertically deposit each container template along a second travel direction via the bag-contacting surface, wherein the bag-contacting surface engages the top exterior side via one or more of a vacuum, electrostatic forces, and adhesion to prevent the container template from moving relative to the bag-contacting surface;
a sealer downstream of the turner to seal the first and second sides in a sealing direction aligned with the second travel direction; and
a shingler to layer predetermined subsets of the plurality of container templates into bundles.

19. The system of claim 18, wherein each container template has interfacing zipper profiles disposed at the first end.

20. The system of claim 18, wherein the cutter is a mechanical cutter.

21. The system of claim 18, further comprising a vacuum conveyor to transport each container template from the turner to the sealer.

22. The system of claim 18, further comprising at least one of a static welder, a spot welder, or an adhesive applier upstream of the sealer and configured to apply one or more static welds, spot welds, or adhesive portions, respectively, to each container template to maintain a shape of each container template.

23. The system of claim 18, wherein the sealer applies at least one of direct conductive heat, convective heat, ultrasonic sealing, laser or other radiation-based sealing, or an adhesive to at least one of the first side and the second side.

24. The system of claim 18, wherein the sealer includes a positionable sealing head transversely movable relative to the second travel direction.

\* \* \* \* \*